United States Patent [19]
Marek et al.

[11] Patent Number: 5,151,763
[45] Date of Patent: Sep. 29, 1992

[54] ACCELERATION AND VIBRATION SENSOR AND METHOD OF MAKING THE SAME

[75] Inventors: Jiri Marek, Reutlingen; Frank Bantien, Ditzingen; Dietmar Haack, Reutlingen; Martin Warth, Schwaikhein, all of Fed. Rep. of Germany

[73] Assignee: Robert Bosch GmbH, Stuttgart, Fed. Rep. of Germany

[21] Appl. No.: 631,623

[22] Filed: Dec. 21, 1990

[30] Foreign Application Priority Data

Jan. 15, 1990 [DE] Fed. Rep. of Germany ....... 4000903

[51] Int. Cl.⁵ ................ H01L 29/84; H01L 29/96
[52] U.S. Cl. .................... 357/26; 357/25; 357/14; 73/517 AV; 73/517 B; 361/280
[58] Field of Search .............. 357/25, 26, 14; 73/517 AV, 517 B, 517 A, 517 R; 361/280

[56] References Cited

U.S. PATENT DOCUMENTS

| | | | |
|---|---|---|---|
| 4,483,194 | 11/1984 | Rudolf | 73/517 B |
| 4,507,705 | 3/1985 | Hoshino et al. | 361/283 |
| 4,653,326 | 3/1987 | Danel et al. | 73/517 R |
| 4,711,128 | 12/1987 | Boura | 73/517 B |
| 4,783,237 | 11/1988 | Aine et al. | 437/15 |
| 4,945,773 | 8/1990 | Sickafus | 73/517 AV |
| 4,951,510 | 8/1990 | Holm-Kennedy et al. | 73/862.04 |
| 4,955,234 | 9/1990 | Marek | 73/517 R |
| 5,006,487 | 4/1991 | Stokes | 73/517 AV |
| 5,016,072 | 5/1991 | Greiff | 357/26 |

FOREIGN PATENT DOCUMENTS

3611969C2 4/1988 Fed. Rep. of Germany .

Primary Examiner—Andrew J. James
Assistant Examiner—Sara W. Crane
Attorney, Agent, or Firm—Frishauf, Holtz, Goodman & Woodward

[57] ABSTRACT

A semiconductor plate having an epitaxial layer of a conductivity type opposite to that of the substrate on which it is formed has a depression, including one or more elongate channels. The depression is etched into a depth passing entirely through the epitaxial layer to isolate at least one tongue extending from a tongue pedestal into the etched depression and having parallel major sides which are perpendicular to the principal planes of the semiconductor plate. The tongue is underetched so that it will be free to vibrate by motion in directions parallel to the principal planes of the plate. One of the major sides of the tongue faces a stationary electrode across a gap and the electrode and the tongue are insulated from each other, at least in one embodiment, by the fact that the etched depression extends all the way through the epitaxial layer in its depth. Deflection or vibration of the tongue changes the capacitance between the electrode and the tongue and contacts are provided for measuring the capacitance. Various embodiments utilizing multiple tongues and one or more electrodes are shown.

10 Claims, 3 Drawing Sheets

ACCELERATION AND VIBRATION SENSOR AND METHOD OF MAKING THE SAME

This invention concerns a sensor manufactured from a base plate or a so-called chip of monocrystalline semiconductor material and having one or more tongues etched out of the base plate having a flat side facing an electrode forming part of the base plate, for use with means for evaluating the deflection of each tongue.

From U.S. Pat. No. 4,955,234, an acceleration sensor is known which is made by etching out of a silicon plate and has a tongue which is suspended on one or more strips so as to be deflected perpendicularly to the chip (pate) surface. The stretching of the strips is measured by means of piezo-resistive elements (strain gauges) arranged in a Wheatstone bridge. The seismic mass of the sensors operating piezo-resistively requires a relatively large portion of the chip surface. Because of the seismic mass constituted as a tongue and its oscillation direction perpendicular to the chip surface, an encapsulation of this known sensor and the reduction of atmospheric pressure within the sensor is often necessary, since the tongue oscillations would otherwise be too greatly damped. In addition, sensors operating piezo-resistively have a great sensitivity to temperature.

Published German Patent Application P 39 27 163 also discloses structures that can be etched out of a semiconductor plate.

SUMMARY OF THE INVENTION

It is an object of the present invention to provide a sensor that has the advantage that by the vertical arrangement of the tongues, sensors can be provided with a very small requirement of chip surface.

Briefly, one or more tongues are provided and each tongue has its major sides perpendicular to a major (face) surface of the base plate (chip), with at least one side facing an electrode across a gap, and has a root end integral with the base plate. Each tongue and its facing electrode are insulated from each other and, by virtue of electrical connections to tongue and electrode, a capacitance change across the gap is measurable.

This arrangement not only uses relatively little chip surface but also makes possible operation of the sensor at atmospheric pressure. The fact that the tongues swing in a space located between the two principal surfaces of the chip has the result that they are protected against overload by the chip itself. There is a further advantage that capacitive evaluation of the sensor signals requires tongues of only slight strength because it is not necessary to stretch piezo resistances by them.

It is particularly useful for the base plate (chip) to have a pn or np junction between an upper layer and the substrate, not only for insulation of the tongue and the electrode from the substrate, but also to provide an etch stop boundary for electrochemical underetching of the tongue, whether the underetching is done laterally from etched troughs in the front side of the plate or by etching the back side of the plate. This underetching serves to provide insulation of the movable tongue from the fixed electrode.

It is advantageous to increase the quiescent capacitance of the sensor by connecting in parallel the capacitances provided by several tongues and respective electrode surfaces. A further advantage lies in the possibility of increasing the sensitivity by evaluation of the capacitance difference of two tongue-electrode pairs which, because of the disposition of the tongues with respect to their corresponding electrodes, produce opposite capacitance changes when they move.

A further advantage is that the sensor can be produced by standard etching technology methods.

BRIEF DESCRIPTION OF THE DRAWINGS.

The invention is further described by way of illustrative example with reference to the annexed drawings, in which.

DESCRIPTION OF THE ILLUSTRATED EMBODIMENTS

Figure 1:
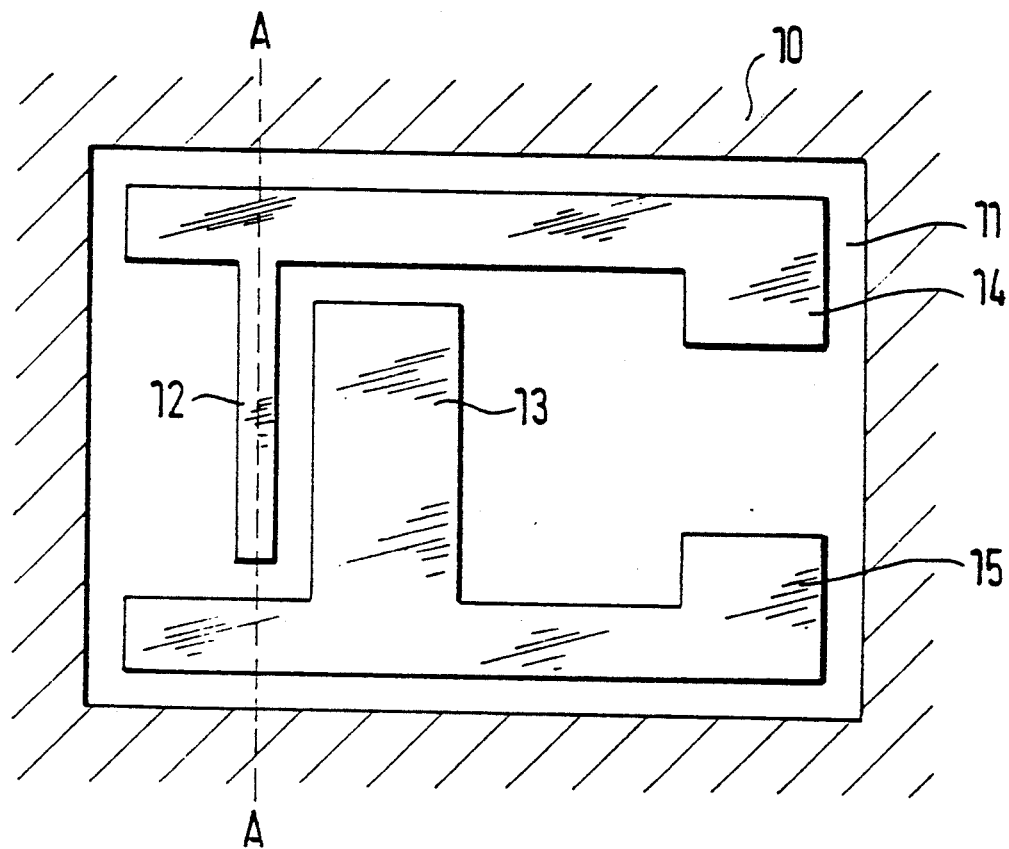
FIG. 1 is a top view of a sensor according to the invention etched into a semiconductor plate.

In FIG. 1 the numeral 10 designates a carrier or base plate of monocrystalline material for which a silicon wafer, for example, can be used. A wafer of any other monocrystalline semiconductive material may also be used for the purpose here described, for example wafers of gallium arsenide or of germanium.

Figure 2:
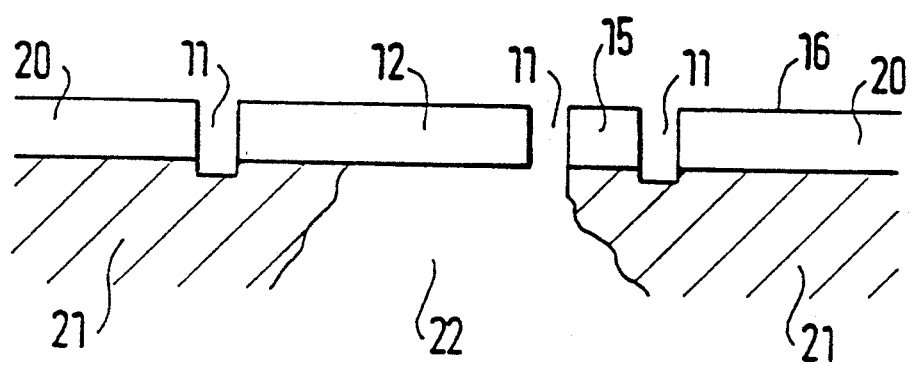
FIG. 2 is a cross section of the sensor of FIG. 1 in a plane passing through the line A—A of FIG. 1.

The base plate consists of a lower layer or substrate 21 and an upper layer 20, as shown in FIG. 2. Usually the lower layer 21 is a p-type doped substrate and the upper layer 20 is an epitaxial layer which is of n-type doping. It is just as possible to utilize, for the sensor of the invention, the inverse doping of the individual layers, since either a pn junction or an np junction operates insulatingly when connected electrically in the blocking direction.

An etched channel or trough 11, which widens into a basin in some places, is shown in FIG. 1 and in profile in FIG. 2. It is produced by anisotropic etching or some other suitable etching process that etches away downwards from the plate surface 16 shown in FIG. 2. This etched depression penetrates fully through the upper layer 20 and thus produces two regions electrically insulated from each other. One of these regions contains a tongue mounting pedestal 14 having an oscillatory tongue 12 capable of swinging in the midplane of the plate. The other of these regions is composed of an electrode pedestal 15 with an immovable electrode 13. The tongue 12 is for example 5 $\mu$m wide, 1–2 mm long and 10–15 $\mu$m high. The slides of the tongue 12 which run longitudinally and are 10–15 $\mu$m high are referred to herein as major sides and those longitudinal sides of the tongue which are, for example, 5 $\mu$m wide may be referred to as minor sides. A major longitudinal side of the tongue 12 faces a longitudinal side of the electrode 13, for example across a gap of 2 $\mu$m, this spacing being subject to change by deflection or swinging of the tongue 12. The tongue pedestal 14 and the electrode pedestal 15 serve as electrical terminals for connections to the tongue 12 and the electrode 13 and the capacitance resulting from their proximity.

Figure 4:
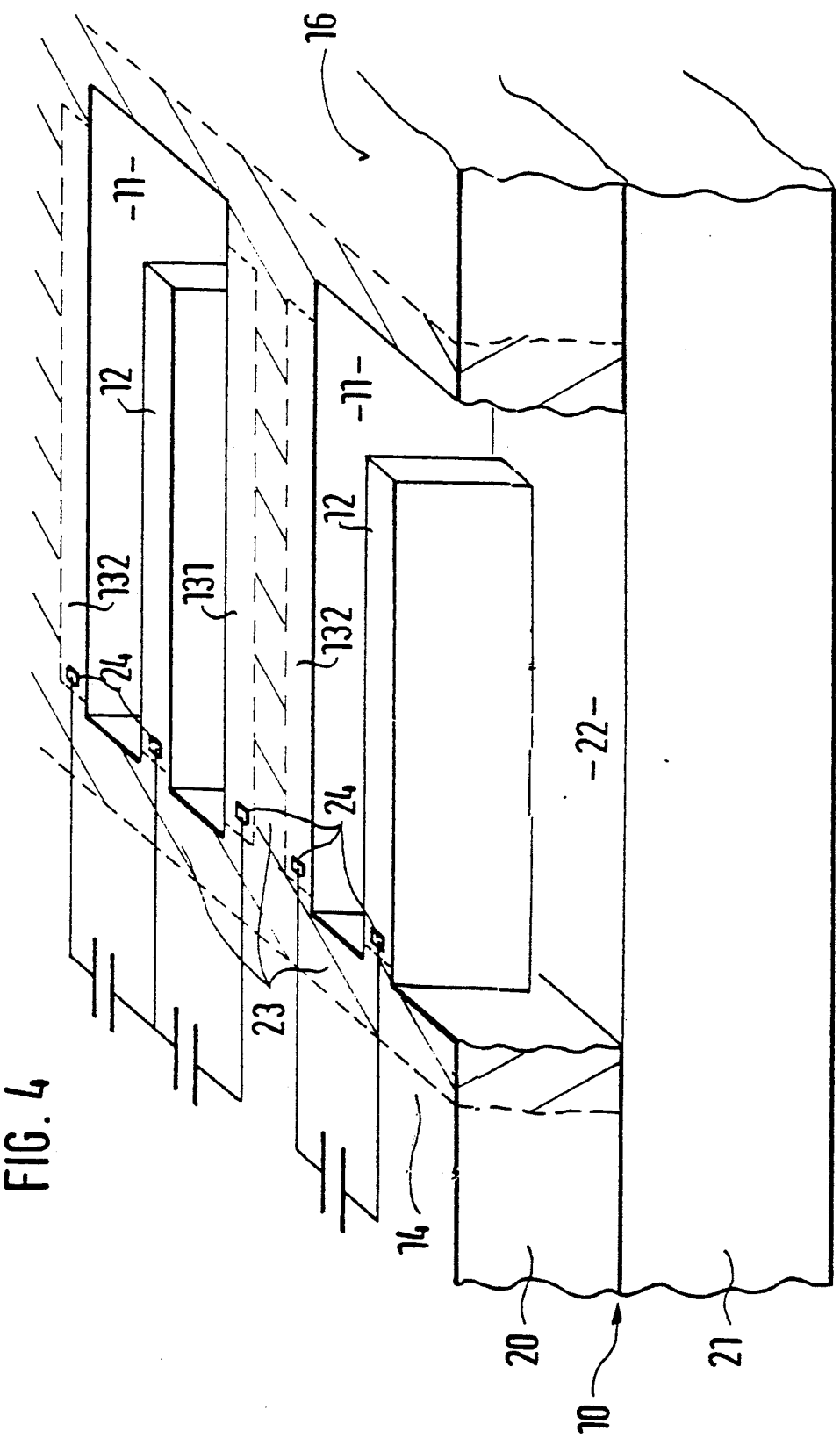
FIG. 4 is a perspective view, partly broken away and partly extended by diagram, of another sensor according to the invention having plural tongues.

FIG. 4 that the tongue 12 is freed for motion by underetching 22 provided beneath it in FIG. 4. The underetching of the tongue 12 can be carried out, for example, by etching from the back side of the plate, which is the bottom side in FIG. 4 as shown in part in FIG. 2 or by lateral underetching from the basin previously etched on the front or top side of the plate. The base plate, of course, may be disposed vertically when the device is complete for disposing the swingable tongues in a vertical position. The front and back sides of the base plate, before etching, which may also be top and bottom when the plate is horizontal may be referred to as face surfaces of the plate.

Figure 3:
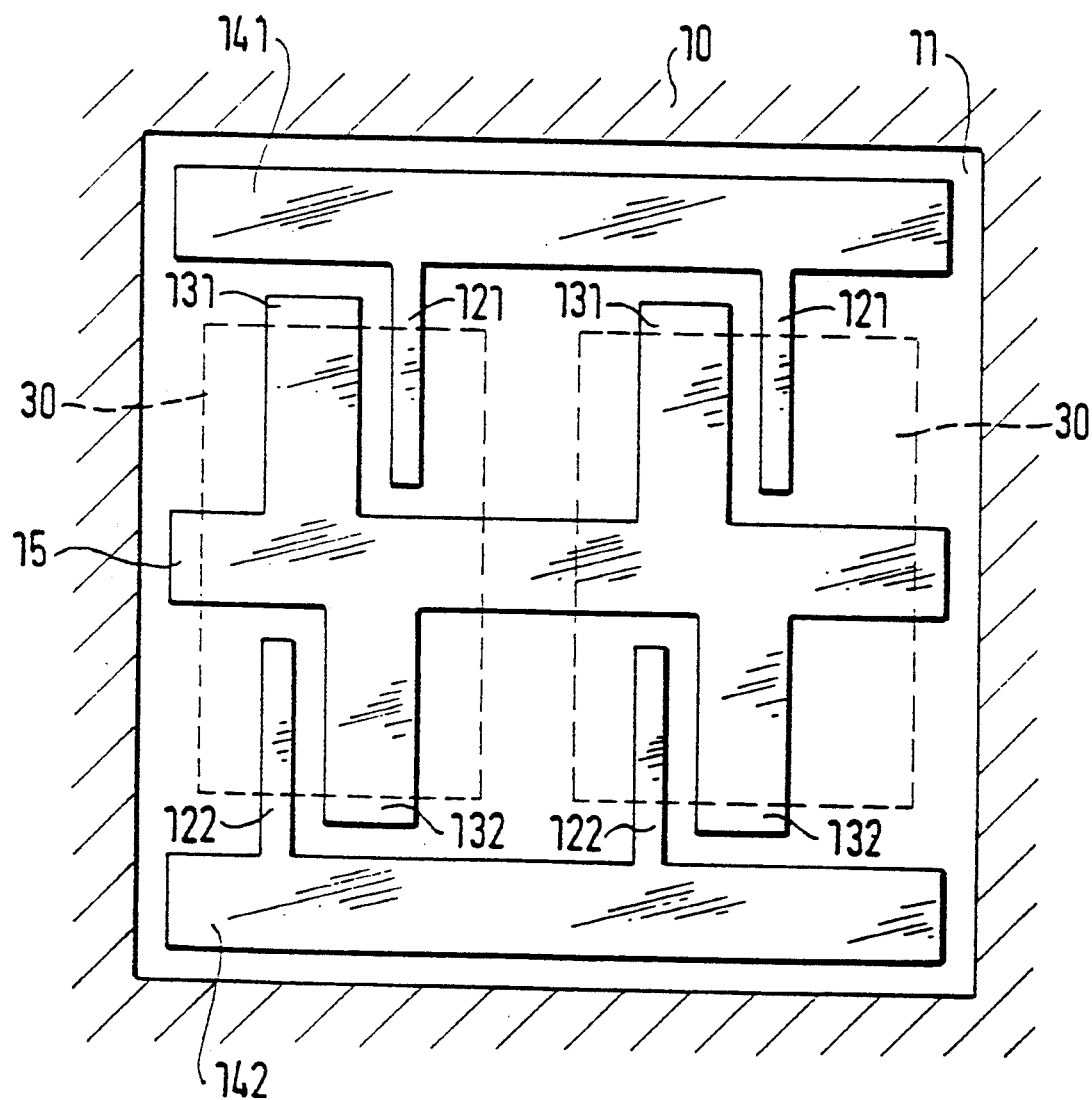
FIG. 3 is a top view similar to FIG. 1 of a sensor according to the invention having four tongues.

It is also possible to etch out two or more tongues and two or more electrodes, with their pedestals, by etching from the base plate surface 16 and to combine them into a parallel connection of capacitatively operating sensors, as for example the upper half of FIG. 3 shows. From a single tongue pedestal or support 141 two tongues 121 extend perpendicularly which can swing in the plane of the base plate and form, together with the two opposite stationary electrodes 131, which extend from one electrode pedestal 15, two capacitances connected in parallel.

The sensor illustrated in FIG. 3 consists again of a two-layer base plate 10, the upper layer 20 of which has several comb-shaped regions insulated electrically from each other by an etched depression 11. A beam-like tongue pedestal 141 with two tongues 121 capable of swinging in the carrier plate plane, which extend perpendicularly to the tongue pedestal 141, is disposed parallel to a similarly structured tongue pedestal 142 which likewise has two tongues 122 capable of swinging in the midplane of the base plate, so arranged that the tongues 121 and 122 are more or less opposite each other. Inbetween them and parallel to the two tongue pedestals 141 and 142 is the electrode pedestal 15 from which extend both the stationary electrodes 131 extending in the direction of the tongue pedestal 141 and the stationary electrodes 132 extending on the direction of the tongue pedestal 142. The number of tongues and electrodes can be varied to any desired extent. The spacing of the tongue pedestal 141 to the electrode pedestal 15 and of the electrode pedestal 15 to the tongue pedestal 142, as well as the length of the tongues and electrodes, are so selected that the longitudinal sides of the electrodes 131 lie facing the longitudinal sides of the tongues 121 at a spacing of for example 2 $\mu$m and the longitudinal sides of the electrodes 132 lie facing the longitudinal sides of the tongues 122 at a similar spacing. The two tongues 121 form with the two electrodes 131 two capacitances connected in parallel which are located opposite capacitances likewise connected in parallel formed by the two tongues 122 together with the two electrodes 132. Furthermore, the arrangement of the tongues 121 with respect to their electrodes 131 is opposite to that of the tongues 122 with reference to their electrodes 132, so that an acceleration which deflects all the tongues produces, in the oppositely located capacitances, spacing changes of opposite kinds between tongues and electrodes. In this arrangement the quiescent capacitance of the sensor is produced by the parallel connection of the several capacitances and the sensitivity is increased by the evaluation of the differences of oppositely changing capacitances.

In FIG. 3 there is designated by the reference numeral 30 the lower edge of an etching window for back side etching. Its position must be chosen so that the tongues remain firmly connected to the tongue pedestal while their ends are free to swing. The electrodes, on the the other hand, must not only be firmly connected to the electrode pedestal but additionally must be bonded at least at some other place (and for convenience all-over) with the substrate layer 21 of the base plate.

In FIG. 4 a sensor is shown, in perspective, which is etched out of a two-layer base plate 10 having a lower layer 21 and an upper layer 20, wherein the two layers, because of their different doping, form a pn or an np junction which insulates the upper layer 20 against the substrate layer 21 when connected electrically in the blocking direction. Two etched depressions 11 are shown which are U-shaped as seen from above which penetrate completely through the upper layer 20 in their depth. These depressions, together with lateral underetching 22, produce two tongues 12 protruding from a tongue pedestal 14 in the upper layer. Such a tongue 12 serves as the movable electrode of a differential plate capacitor having two stationary electrodes 131 and 132 which are formed by those parts of the peripheral borders of the U-shaped depressions 11 which are left standing parallel to the tongues 12. The insulation of the tongues 12 and the electrodes 131 and 132 against each other is produced in the upper layer 20 by an insulating diffusion 23 which penetrates the upper layer 20 completely in depth and extending as shown by the diagonally shaded area in FIG. 4. This diffusion is either a p diffusion if the upper layer 20 is n-doped or an n diffusion if the upper layer 20 is p-doped. The tongues 12 and the electrodes 131 and 132 are therefore insulated both from each other and from the lower layer 21 by pn junctions. In order to be able to evaluate the capacitance changes of the differential plate condenser upon deflection of the tongues 12 by means of a circuit, metal contacts 24 are provided on the base plate surface 16 respectively at the tongue pedestal ends of the tongues 12 and at the electrodes 131 and 132. By deflection of the tongues 12 the capacitance between the tongue 12 and the electrode 131 is, for example, raised, while the capacitance between the tongues 12 and the electrode 132 is lowered. With the parallel connection of several such differential plate capacitances, neighboring stationary electrodes 131 and 132 must be insulated from each other in order that the capacitance increase on one side is not compensated by the capacitance decrease on the other side. In the illustrated case that is provided for by insulation diffusion 23 which completely penetrates through the upper layer 20. The kind of insulation provided by an etched-out isolation, as shown in FIGS. 1 and 3, is equally well suited for providing the necessary insulation.

We claim:

1. A sensor for measurement of vibration or acceleration which is manufactured from a base plate of monocrystalline semiconductive material consisting of silicon containing minor amounts of other elements for affecting the conductivity types (p or n) of the material and having at least one tongue (12) etched out of said base plate and means for evaluating a deflection of said at least one tongue, characterized in that said base plate comprises an upper layer (20) and a lower layer (21) which on account of n-type or p-type doping of said lower layer provides a pn junction in the case of said n-type doping or an np junction in the case of said p-type doping at its junction with said lower layer (21);

in that said at least one tongue has major sides perpendicular to a face surface of said base plate, has at least one major side facing, across a gap, a surface of said at least one electrode, has a firm root end which is integral with said base plate and has a free end longitudinally opposite to said root end, said electrode surface facing said tongue being perpendicular to a face surface of said base plate, said at least one tongue (12) and said at least one electrode (13) being formed entirely in said upper layer (20);

in that the surfaces respectively of said at least one tongue and of said at least one electrode are of said material consisting of silicon containing minor amounts of other elements;

in that said at least one tongue (12) and said at least one electrode (13) are insulated from each other by etched channels which extend in depth completely through said upper layer (20), and in that, by virtue of electrical connections to said at least one tongue and said at least one electrode, a capacitance change between said at least one tongue and said at least one electrode is measurable, whereby the deflection of said tongue by vibration or acceleration of said base plate is measurable.

2. A sensor for measurement of vibration or acceleration which is manufactured from a base plate of monocrystalline semiconductive material consisting of silicon containing minor amounts of other elements for affecting the conductivity types (p or n) of the material and having at least one tongue (12) etched out of said base plate and means for evaluating a deflection of said at least one tongue, characterized in that said base plate comprises an upper layer (21) and a lower layer (20) which on account of n-type or p-type doping of said lower layer provides a pn junction in the case of said n-type doping or an np junction in the case of said p-type doping at its junction with said lower layer (21);

in that said at least one tongue has major sides perpendicular to a face surface of said base late, has at least one major side facing, across a gap, a surface of said at least one electrode, has a firm root end which is integral with said base plate and has a free end longitudinally opposite to said root end, said electrode surface facing said tongue being perpendicular to a face surface of said base plate, said at least one tongue (12) and said at least one electrode (13) are formed entirely in said upper layer (20);

in that the surfaces respectively of said at least one tongue and of said at least one electrode are of said material consisting of silicon containing minor amounts of the elements;

in that said at least one tongue (12) and said at least one electrode (13) are insulated from each other by diffused isolation barriers (23) which extend in depth completely through said upper layer (20), and in that by virtue of electrical connections to said at least one tongue and said at least one electrode, a capacitance change between said at least one tongue and said at least one electrode is measurable, whereby the deflection of said tongue by vibration or acceleration of said base plate is measurable.

3. The sensor of claim 1, wherein a plurality of tongues etched out of said base plate are provided and wherein said electrode is faced by a plurality of said tongues.

4. The sensor of claim 2, wherein a plurality of tongues etched out of said base plate are provided and wherein said electrode is faced by a plurality of said tongues.

5. The sensor of claim 1, wherein there are provided a plurality of said tongues (12) and a plurality of electrodes (13) each said electrode being faced by a side of one of said tongues, half the number of tongues having a side facing a first electrode and the remainder of said tongues having a side facing a second electrode, said electrodes being disposed with respect to said tongues so that, in response to acceleration or vibration, a movement relative to said first electrode by said tongues having a side facing said first electrode is opposite to a contemporary movement relative to said second electrode by said remainder of said tongues with respect to said second electrode.

6. The sensor of claim 2, wherein there are provided a plurality of said tongues (12) and a plurality of electrodes (13) each said electrode being faced by a side of one said tongues, half the number of tongues having a side facing a first electrode and the remainder of said tongues having a side facing a second electrode, said electrodes being disposed with respect to said tongues so that, in response to acceleration or vibration, a movement relative to said first electrode by said tongues having a side facing said first electrode is opposite to a contemporary movement relative to said second electrode by said remainder of said tongues with respect to said second electrode.

7. The sensor of claim 5, wherein said electrodes have a configuration in which they extend in comb configuration from the common electrode connecting member and wherein said tongues are disposed in a configuration in which there is at least one pedestal member, from which said tongues extend in comb configuration from said pedestal member.

8. The sensor of claim 6, wherein said electrodes have a configuration in which they extend in comb configuration from the common electrode connecting member and wherein said tongues are disposed in a configuration in which there is at least one pedestal member, from which said tongues extend in comb configuration from said pedestal member.

9. The sensor of claim 1, wherein said at least one tongue having the side facing said electrode has another side facing a second electrode, whereby movement of said at least one tongue in response to vibration or acceleration will move said tongue simultaneously closer to one of said electrodes and away from the other of said electrodes.

10. The sensor of claim 2, wherein said at least one tongue having the side facing said electrode has another side facing a second electrode, whereby movement of said at least one tongue in response to vibration or acceleration ill move said tongue simultaneously closer to one of said electrodes and away from the other of said electrodes.

* * * * *